United States Patent

[11] 3,594,614

[72] Inventors Werner B. Halbeck
 Cedarburg;
 John A. Quaal, Milwaukee, both of, Wis.
[21] Appl. No. 14,445
[22] Filed Feb. 26, 1970
[45] Patented July 20, 1971
[73] Assignee Cutler-Hammer, Inc.
 Milwaukee, Wis.

[54] ENERGIZING CIRCUIT FOR THE DC OPERATING
WINDING OF AN ELECTROMAGNETIC
CONTACTOR OR THE LIKE
5 Claims, 5 Drawing Figs.
[52] U.S. Cl. .................................................. 317/123,
 200/166 R, 335/129, 335/132, 335/151, 317/DIG.
 6, 317/155.5
[51] Int. Cl. ..................................................... H01h 47/02
[50] Field of Search ........................................... 317/123,
 141, DIG. 6

[56] References Cited
UNITED STATES PATENTS

| 2,279,849 | 4/1942 | Warrington | 317/DIG. 6 |
| 2,424,344 | 7/1947 | Veinoff | 321/8 |
| 2,472,553 | 6/1949 | Theunissen | 317/123 |
| 3,131,331 | 4/1964 | Ray | 317/123 |
| 3,200,302 | 8/1965 | Krebs et al. | 317/141 |
| 3,239,627 | 4/1966 | Davies et al. | 335/128 |

Primary Examiner—Lee T. Hix
Attorney—Hugh R. Rather

ABSTRACT: An improved circuit for energizing and quickly deenergizing the DC operating winding of an electromagnetic contactor from sources of AC supply having a wide range of frequencies. It employs a full wave rectifier bridge, an auxiliary electromagnetic switch having a pair of low-inductance operating windings and normally open contacts. One of the auxiliary switch windings of high resistance is connected across the DC output terminals of the rectifier bridge while the other thereof of low resistance is connected across the same terminal in series with the normally open contacts and the operating winding of the electromagnetic contactor.

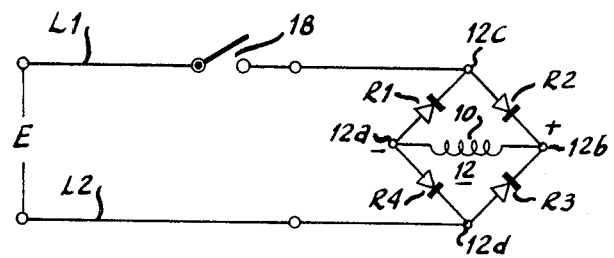
Fig. 1
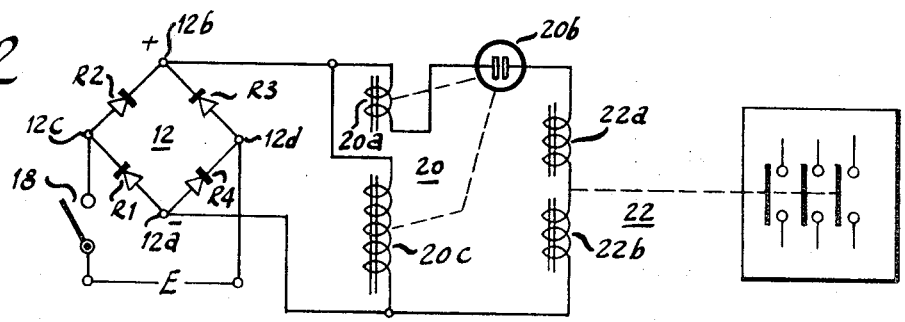
Fig. 2
Fig. 3
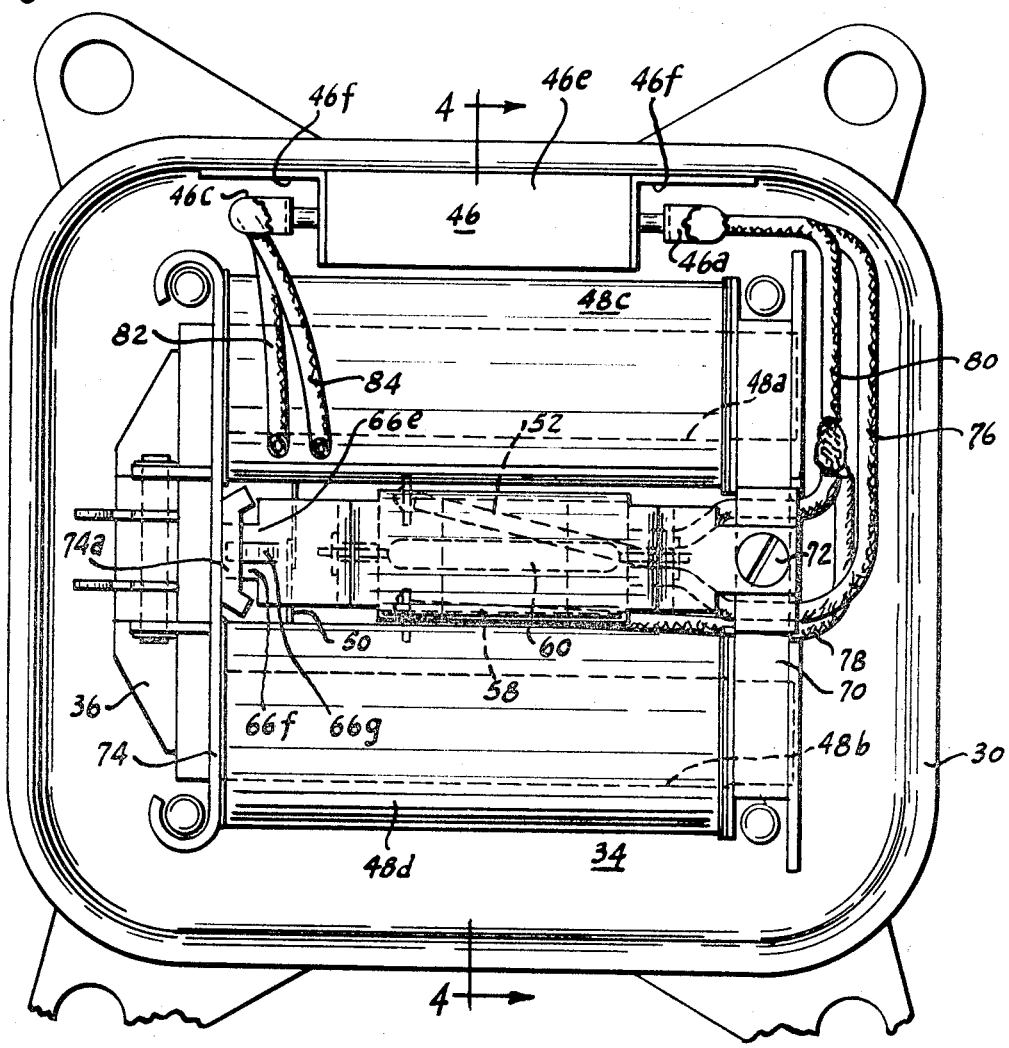

3,594,614

ENERGIZING CIRCUIT FOR THE DC OPERATING WINDING OF AN ELECTROMAGNETIC CONTACTOR OR THE LIKE

BACKGROUND OF THE INVENTION

Compact electromagnetic contactors and relays used in aircraft commonly employ DC operating windings. This requires use of rectifiers between the AC supply and the operating windings, with the latter normally connected across the output terminals of a full wave rectifier bridge. When the AC supply to the rectifier bridge is interrupted the DC operating winding is rather slow in dissipating its stored energy resulting in slow-to-release action of the contactor and its contacts.

To break contact welds, and prevent contact erosion resulting from contact bounce the contact opening force imparted through armature return springs should act quickly and strongly. Hammer below like initial accelerating forces are desirable. It will be appreciated that if the magnetic armature holding force decays slowly upon deenergization of an operating winding the accelerating ability of the armature return springs will be commensurately debilitated.

It is a primary object of the present invention to provide an improved circuit for energizing the DC energizing windings of electromagnetic contactors from a source of AC supply.

A further object is to provide a circuit of the aforementioned type which is deenergized by quick release action of the contacts upon interruption of the AC source to the operating coil and which is further characterized by steady contact maintenance when the operating coil is energized from AC sources having widely different operating frequencies.

Other objects and advantages of the invention will hereinafter appear.

BRIEF DESCRIPTION OF THE DRAWINGS

FIG. 1 is a diagrammatic showing of a prior art circuit for energizing DC operating coils from a source of alternating current supply.

FIG. 2 is a diagrammatic showing of an improved circuit made in accordance with the invention for energizing the operating coils of such contactors.

FIG. 3 is a top view, with a cover and contacts removed, of a hermetically sealed electromagnetic contactor to which the circuit of FIG. 2 is applied.

DESCRIPTION OF THE PREFERRED EMBODIMENT

Figure 4:
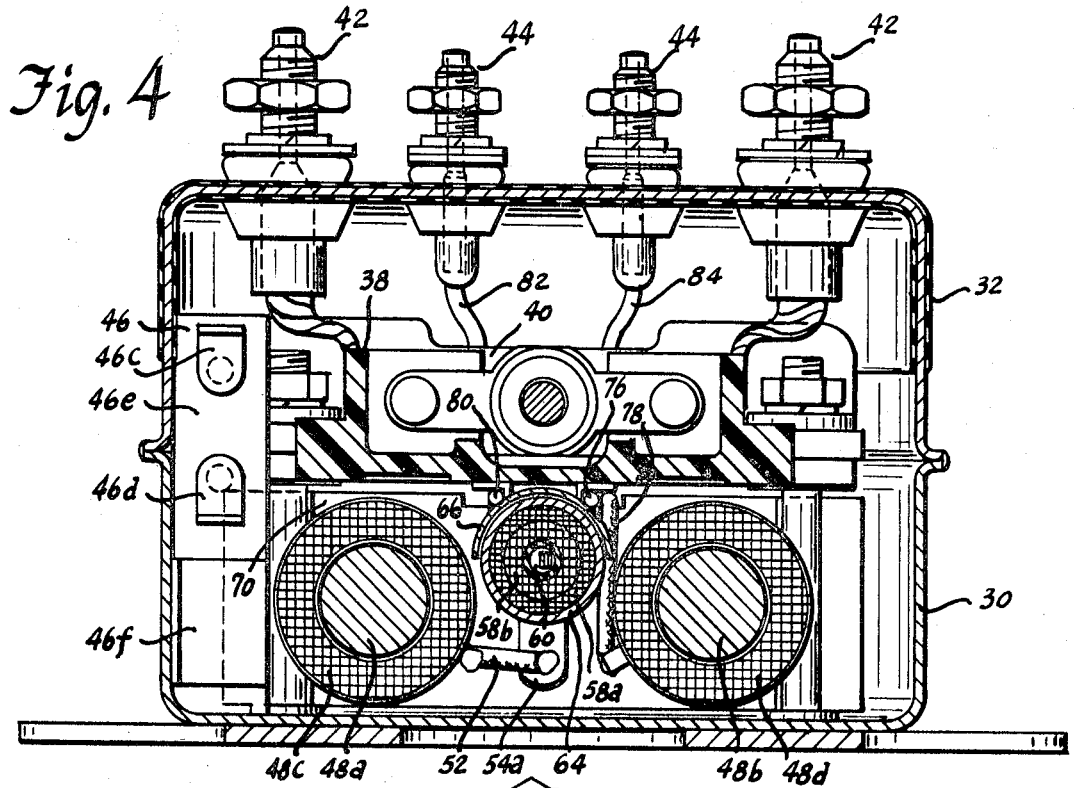
FIG. 4 is a view in transverse cross section of the contactor taken along the line 4—4 of FIG. 3.

FIG. 1 depicts the arrangement heretofore commonly used in energizing the DC operating winding of contactor or relay from a source of AC supply. More particularly a DC electromagnetic energizing coil 10 is connected across the output terminals 12a and 12b of a full wave rectifier bridge 12 which also comprises half wave rectifier r, to r4. The AC input terminals 12c and 12d are connected to AC supply lines 14 and 16 and a switch 18. Upon closure of switch 18 rectified AC or pulsating unidirectional current is supplied to coil 10 to energize the same.

In certain applications involving the use of power relays and contactors supplied from AC supply sources a prevalent slow-to-release condition has been found to exist upon opening of switch 18. This is due to slow dissipation of the magnetic energy stored in the field existing about coil 10. It will be noted that upon opening of switch 18, the individual rectifiers in the bridge 12 immediately provide local circuits for flow of the induced current and is not dissipated by arcing at the contacts of switch 18.

FIG. 2 shows an improved circuit for energizing a DC operating winding of a power relay or contactor from an AC supply source which overcomes the aforedescribed slow-to-release problem. More particularly it employs the same rectifier bridge 12 and switch 18 as shown in FIG. 1 connected to the AC supply through lines L1 and L2. DC output terminal 12b of the rectifier bridge is connected in series with the low-resistance, low-impedance coil 20a of a sensitive electromagnetic switch 20 which preferably has hermetically sealed reed switch contacts 20b. The other end of coil 20a is connected in series with reed switch contacts 20b, and the DC electromagnetic operating coil 22a of a power contactor 22. As depicted contactor has another coil 22b, like coil 22a, which is connected in series therewith. The main, high-resistance, low-inductance operating coil 20c of switch 20 is connected at one end to the point common between terminal 12b and coil 20a, and is connected at its other end to the point common between terminal 12a and coil 22b of contactor 22.

When lines L1 and L2 are initially energized by closure of switch 18 pulsating DC current flows from terminal 12b through coil 20c. If the frequency of the AC voltage is applied to the rectifier bridge is 60 Hz., the contacts 20c may tend to vibrate. However, when they initially close this provides for current flow from terminal 12b through coil 20a, then closes contacts 20b and coils 22a and 22b to terminal 12a. The high inductance of the coils 22a and 22b prevents the current flowing in the last mentioned circuit from approaching zero as a consequence of the AC input voltage going to zero 120 times each second. Accordingly the additional ampere turns provided by coil 20a prevents the contacts 20b from opening. When the AC supply to bridge 12 is interrupted coil 20c, because of its low inductance, deenergizes rapidly to permit rapid opening of contacts 20b. The inductive energy stored in coils 20a and 22 a and 22b is rapidly dissipated in arcing at contacts 20b when the latter opens. Consequently, the contact drop out time of contactor 22 is considerably shortened from that obtainable from the circuit of FIG. 1.

In a commercial version of a hermetically sealed contactor for use with either 60 or 400 Hz. AC supply sources which will hereinafter be described, the coils of switch 20 and contactor 22 were selected to have the following values of resistance and inductance:

Coil 20a—7.98 ohms and $0.14 \times 10^{13}$ henries

Coil 20c—13.26 k. ohms and 0.59 henries

Coil 22a—860 ohms and 58 henries and 22b (In Series)

Figure 5:
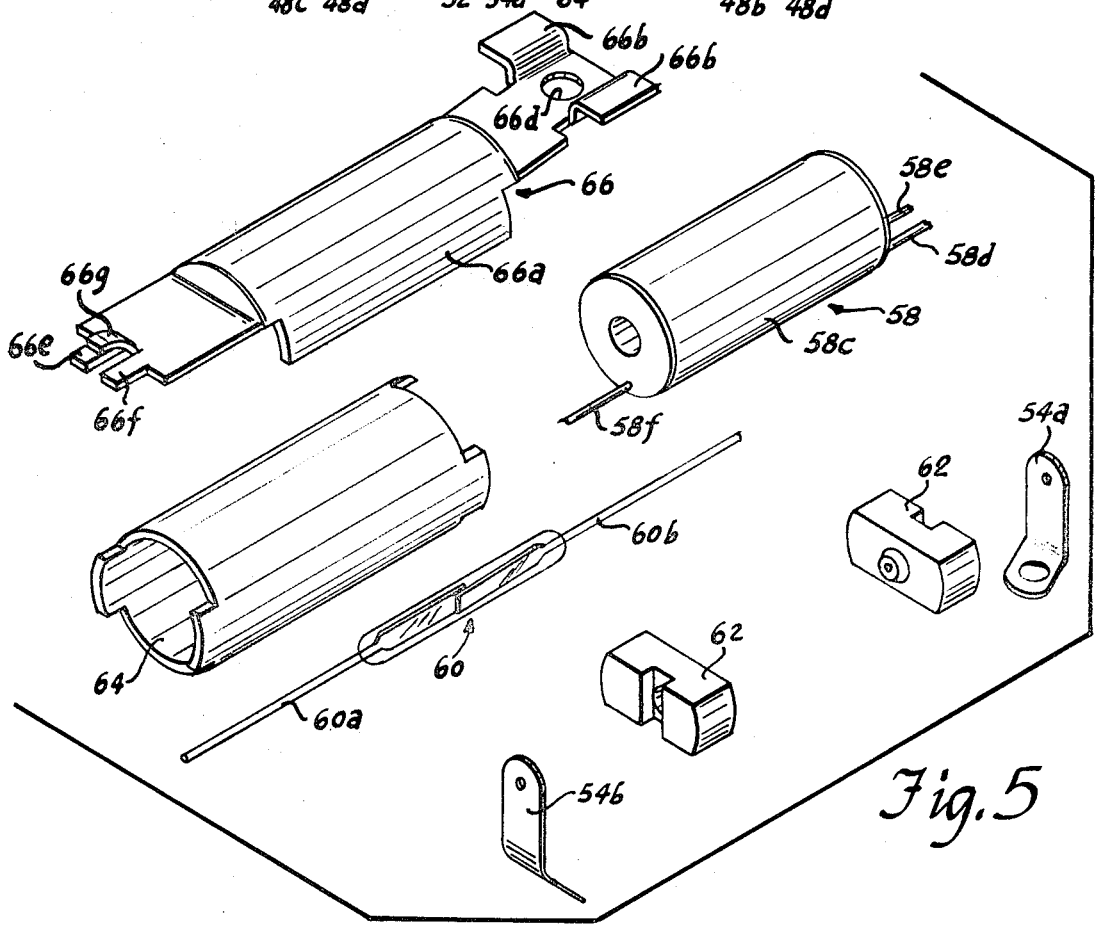
FIG. 5 is an exploded view of certain of the parts used in the improved energizing circuit.

FIGS. 3 to 5 disclose an embodiment of the circuit of FIG. 2 in a commercially available hermetically sealed electromagnetic contactor of the type disclosed in the Davies et al. U.S. Pat. No. 3,239,627 which has been assigned to the assignee of the present application. More particularly the contactor comprises a bottom casing 30, a top cover 32 and a stationary magnet and coil assembly 34, an armature 36, a control base 38, a movable contact assembly 40, main contact terminals 42, coil contact terminals 44, and a rectifier pack 46.

The coil and stationary magnet assembly comprises spaced apart parallel iron cores 48a and 48b which respectively have coils 48c and 48d wound thereon. Coils 48c and 48d are connected together at adjacent ends through a conductor 50. The other end of coil 48c is connected through a short conductor 52 to a terminal 54a of reed switch assembly 56. As best shown in FIG. 5, switch assembly in addition comprises coil module 58, a glass encased reed switch 60, an iron magnetic coil surround member 64, a mounting bracket 66, and a second terminal 54b.

Coil module 58 comprises concentrically wound coils 58a and 58b, that correspond respectively to coils 20a and 20c aforedescribed in connection with FIG. 2, which are encased in molded epoxy casing 58c of an elongated annular form. Module 58 is provided with a longitudinal clearance opening to accommodate the casing of reed switch 60. Module 58 in turn closely fits with the interior wall of member 64 which provides a magnetic flux return path, and the external terminals 60a and 60b extend through clearance openings in the insulator blocks 62. Terminals 54a and 54c are soldered to the terminals 60a and 60b and hold the blocks 62 in abutting relation against the ends of casing 58. Two wire leads 58d and 58e extend out one end of module casing 58c, and a single-wire lead 58f extends out of the other end thereof.

Member 64 is secured to the underside of the semicylindrical portion 66a of mounting bracket 66, preferably by an insulating adhesive tape formed of Teflon. At one end bracket 68 has a outwardly turned flanges 66b of a channel-shaped mounting portion 66c which has a screw accommodating opening 66d formed therein. The portion 66c seats within a notch formed in a molded support block 70 for the main coil assemblies and a screw 72 takes into a threaded insert (not shown) to hold one end of bracket 66 in place. The other end of bracket 66 is provided with two spaced parallel tongue portions 66e and 66f and an upwardly and outwardly curved tongue 66g. The tongues 66e and 66f fit within complementary openings in the front armature and main coil support plate 74. The tongue 66g hooks over a tang 74a a struck and bent out of the plate 74.

Wire lead 58d, which internally of module 58 is connected to corresponding ends of the coils 58a and 58b, is connected to a wire lead 76 which in turn is connected to the positive DC output terminal 46b (not shown) of rectifier pack 46. Lead 58f which internally of casing 58c is connected to the other end of coil 58a is connected together with terminal 60a of reed switch 60 to terminal 54b. The terminal 60b of reed switch 60 is connected to terminal 54a, and the latter as aforementioned is connected through lead 52 to one end of main operating coil 48c. The lead 58e which internally of casing 58e is connected to the other end of coil 58b is connected by a wire lead 78 to a lead 80 with which it is electrically bonded. Lead 80 at one end is connected to the negative DC output terminal 46a of rectifier pack 46, and at its other end has connection with the other end of main operating coil 46d.

Rectifier pack 46 has external AC input terminals 46c and 46d that are connected through wire leads to the coil input terminals 44. Internally it may be assumed that rectifier pack 46 comprises a full wave set of power half wave rectifiers (not shown) electrically connected together and to AC input terminals 46a and 46b and DC output terminals 46c and 46d as depicted for full wave rectifier 12 in FIG. 2. Such rectifiers and interconnections are preferably molded in situ in a suitable insulating compound to form a molded casing 46e. Right-angle mounting brackets 46e which have one leg of each thereof molded in place in casing 46f are spot welded at their other legs to the inner wall of casing 30.

It has been found that the improved energizing circuit hereinbefore described works well with either 60 or 400 Hz. AC supply sources and provides quick contact drop out operation of the main contactor. While the circuit has been described in conjunction with contactors having two series connected main operating coils, it will work equally well with contactors or relays having a single-operating coil.

I claim:

1. In combination:
   a. a full wave rectifier bridge having input terminals for connection to and disconnection from a source of alternating potential and a pair of unidirectional current output terminals;
   b. a first electromagnetic device having an energizing coil;
   c. a second electromagnetic device having a first energizing coil connected across the rectifier bridge output terminals, a second energizing coil, and normally open contacts connected in series with said second energizing coil and the energizing coil of said first electromagnetic device across said rectifier bridge output terminals;
   d. said coils of said second electromagnetic device having inductive time constants substantially less than that of the energizing coil of said first electromagnetic device to afford, upon interruption of input potential to said bridge, rapid opening of its associated contacts and subsequent rapid dissipation of stored inductive energy in the energizing coil of said first electromagnetic device.

2. The combination according to claim 1, wherein said first energizing coil of said second electromagnetic device is of high resistance and said second energizing coil is of low resistance and both are of relatively low inductance compared to the energizing coil of said first electromagnetic device.

3. The combination according to claim 1, wherein the normally open contacts of said second electromagnetic are of the enclosed reed switch type and wherein said first and second energizing coils are concentrically disposed about said reed switch.

4. The combination with an electromagnetic contactor or the like having a pair of parallel, spaced apart operating coils and a movable armature, of means for energizing said coils with unidirectional current derived from a source of AC supply, comprising:
   a. a full wave rectifier bridge;
   b. an auxiliary electromagnetic switch having contacts sealed within a casing, first and second energizing coils concentrically disposed about said casing with the first coil connected directly across the output terminals of said rectifier bridge and the second coil connected in series with its associated contacts and the series connected operating coils of said contactor across said output terminals;
   c. said auxiliary electromagnetic switch being disposed in proximity to and between said operating coils of said contactor.

5. The combination according to claim 4 wherein the auxiliary switch energizing coils are encapsulated in an annular nonmagnetic casing and the switch contacts are in a sealed envelope disposed within said annular casing, and wherein the auxiliary switch assembly is surrounded by an annular iron member.

PO-1050
(5/69)

UNITED STATES PATENT OFFICE
CERTIFICATE OF CORRECTION

Patent No. 3,594,614  Dated July 20, 1971

Inventor(s) Werner B. Halbeck & John A. Quaal

It is certified that error appears in the above-identified patent and that said Letters Patent are hereby corrected as shown below:

Column 2, line 18, "is" should be omitted;

line 42, "$10^{13}$" should be --$10^{-3}$--;

line 67, "surround" should be --surrounding--.

Column 3, line 11, "a" (first occurrence) should be --an-- and "flanges" should be --flange--;

line 21, "a" (second occurrence) should be omitted.

Column 4, line 26, "electromagnetic" should be --electromagnet--

Signed and sealed this 28th day of March 1972.

(SEAL)
Attest:

EDWARD M. FLETCHER, JR.
Attesting Officer

ROBERT GOTTSCHALK
Commissioner of Patents